US012712800B2

(12) United States Patent
Sethia et al.

(10) Patent No.: US 12,712,800 B2
(45) Date of Patent: Aug. 18, 2026

(54) SYSTEM AND METHOD TO DYNAMICALLY MAINTAIN A DISTRIBUTED TESTING ENVIRONMENT

(71) Applicant: Bank of America Corporation, Charlotte, NC (US)

(72) Inventors: Maneesh Kumar Sethia, Hyderabad (IN); Abhijit Behera, Hyderabad (IN); Manimaran Sundaravel, Chennai (IN); Sivashalini Sivajothi, Chennai (IN); Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 86 days.

(21) Appl. No.: 18/419,903

(22) Filed: Jan. 23, 2024

(65) Prior Publication Data

US 2025/0240230 A1 Jul. 24, 2025

(51) Int. Cl.
*H04L 43/50* (2022.01)
*H04L 43/06* (2022.01)

(52) U.S. Cl.
CPC .............. *H04L 43/50* (2013.01); *H04L 43/06* (2013.01)

(58) Field of Classification Search
CPC ......... H04L 43/50; H04L 43/08; H04L 43/06; H04L 43/55; H04L 63/1433; H04L 41/40; H04L 43/04; H04L 43/00; H04L 47/2475
See application file for complete search history.

(56) References Cited

U.S. PATENT DOCUMENTS

| | | | |
|---|---|---|---|
| 7,698,239 | B2 | 4/2010 | Lieuallen et al. |
| 8,510,600 | B2 | 8/2013 | Broda et al. |
| 8,639,791 | B2 | 1/2014 | Carter et al. |
| 8,990,813 | B2 | 3/2015 | Frields et al. |
| 9,384,121 | B2 | 7/2016 | Jackson et al. |
| 9,459,987 | B2 | 10/2016 | Weaver et al. |
| 9,703,660 | B2 | 7/2017 | Cillis et al. |
| 10,026,070 | B2 | 7/2018 | Thorpe et al. |
| 10,083,027 | B2 | 9/2018 | Moorthi et al. |
| 10,120,787 | B1 | 11/2018 | Shemer et al. |

(Continued)

OTHER PUBLICATIONS

Maneesh Kumar Sethia, System and method to dynamically configure cloud resources, U.S. Appl. No. 18/419,841, filed Jan. 23, 2024, pp. 1-42.

(Continued)

*Primary Examiner* — Rachel J Hackenberg

(57) ABSTRACT

An apparatus comprises a memory communicatively coupled to a processor. The memory is configured to store multiple deployment operations configured to control access to one or more portions of application data. The processor is configured to determine a deployment operation associated with a portion of the application data, perform multiple collected testing operations for the portion of the application data based at least in part upon the deployment operation, and determine pod data indicating multiple role parameters based at least in part upon the deployment operation. The role parameters are configured to indicate multiple testing operations on the portion of the application data. Further, the processor is configured to identify a pod that at least partially matches the pod data and trigger one or more distributed testing operations at the pod.

20 Claims, 4 Drawing Sheets

(56) References Cited

U.S. PATENT DOCUMENTS

| | | | |
|---|---|---|---|
| 10,402,301 | B2 | 9/2019 | Qadri et al. |
| 10,445,222 | B2 | 10/2019 | Mankovskii |
| 10,514,436 | B2 | 12/2019 | Leibfritz et al. |
| 10,635,476 | B2 | 4/2020 | Blum et al. |
| 11,074,165 | B2 | 7/2021 | Khakare et al. |
| 11,102,081 | B1 * | 8/2021 | Tiwari .............. G06F 16/90335 |
| 11,442,102 | B2 | 9/2022 | Mandyam Krishnakumar et al. |
| 2014/0236527 | A1 | 8/2014 | Chan et al. |
| 2018/0165183 | A1 * | 6/2018 | Kremp ................ G06F 21/6218 |
| 2019/0052551 | A1 | 2/2019 | Barczynski et al. |
| 2019/0087307 | A1 | 3/2019 | Zhan et al. |
| 2019/0333366 | A1 | 10/2019 | Messinger et al. |
| 2022/0012168 | A1 * | 1/2022 | Challa ................ G06F 11/3688 |
| 2022/0197781 | A1 * | 6/2022 | Mohamed El Amine .................. G06F 11/3688 |
| 2022/0276953 | A1 * | 9/2022 | Padala ................ G06F 11/3433 |
| 2024/0152378 | A1 * | 5/2024 | Sadasivan ................. G06F 8/60 |

OTHER PUBLICATIONS

Maneesh Kumar Sethia, System and method to dynamically manage access to network resources, U.S. Appl. No. 18/419,873, filed Jan. 23, 2024, pp. 1-42.

* cited by examiner

SYSTEM AND METHOD TO DYNAMICALLY MAINTAIN A DISTRIBUTED TESTING ENVIRONMENT

TECHNICAL FIELD

The present disclosure relates generally to distributed testing operations in a testing environment, and more specifically to a system and method to dynamically maintain a distributed testing environment.

BACKGROUND

Testing centers do not maintain testing operations over long periods of time. Testing performed at testing centers cannot continue if the testing centers are unavailable. A specific testing center may be unavailable any time that a power shutdown or any other interruptions occur. The specific testing center may not perform testing operations and/or update the testing operations.

SUMMARY OF THE DISCLOSURE

In one or more embodiments, a system and method are configured to perform distributed testing operations and/or collected testing operations in a testing environment. In particular, the system and method may be configured to enable access between one or more testing resources and one or more testing locations in the testing environment. The testing resources may be cloud resources and/or network resources configured to enable testing operations to be performed on-demand in the testing environment. In some embodiments, on-demand refers to accessing the testing operations at any time and/or upon request. The testing operations may be performed by one or more managed servers, one or more user devices, and/or one or more users operating managed servers and/or user devices. The testing operations may comprise evaluating one or more portions of application data. The testing operations may be dynamically assigned to one or more pods. In the pods, the testing operations may be assigned to specific managed servers, specific user devices, and/or specific users based on corresponding preconfigured roles. In one or more embodiments, the system and method may be configured to test, deploy, and scan portions of the application data in collected and/or distributed operations. The collected operations may be testing operations performed at pods in a same location and/or in association with a specific managed server. The distributed operations may be testing operations performed at pods in a same location and/or in association with a specific managed server. In one or more embodiments, one of the managed servers may be configured to push testing operations to testing nodes as part of a development pipeline.

In one or more embodiments, the system and the method described herein are integrated into a practical application of performing distributed testing operations and/or collected testing operations in a testing environment. For example, testing resources in the testing environment may be made available to perform testing operations to multiple managed servers and/or user devices at a given time. In some embodiments, the managed servers and/or user devices are configured to perform testing operations that evaluate one or more specific portions of application data. The system and method may provide testing operation information to the managed servers and/or the user devices to verify that these devices are configured to perform testing operations. In this regard, the system and method are configured to enable secure implementation of testing operations on-demand in the testing environment. In the event that a managed server and/or user device is unavailable to perform specific testing operations, the system and method may be configured to reassign testing operations to another managed server and/or user device that is available to perform the specific testing operations.

In one or more embodiments, the system and method are directed to improvements in computer systems. Specifically, the system and the method reduce processor and memory usage in managed servers and/or user devices by dynamically allocating testing operations in a distributed testing environment. Further, the system and the method are configured to reduce the possibility of declining testing operations by reallocating specific testing operations to available pods in the testing environment.

In one or more embodiments, the system and the method may be performed by an apparatus, such as the server. Further, the system may be a data exchange system, which comprises the apparatus. In addition, the system and the method may be performed as part of a process performed by the apparatus. As a non-limiting example, the apparatus may comprise a memory and a processor communicatively coupled to one another. The memory may be configured to store multiple deployment operations configured to control access to one or more portions of application data. The processor may be configured to determine a deployment operation associated with a portion of the application data, perform multiple collected testing operations for the portion of the application data based at least in part upon the deployment operation, and determine pod data indicating multiple role parameters based at least in part upon the deployment operation. The role parameters may be configured to indicate multiple testing operations on the portion of the application data. Further, the processor may be configured to identify a pod that at least partially matches the pod data and trigger one or more distributed testing operations at the pod.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
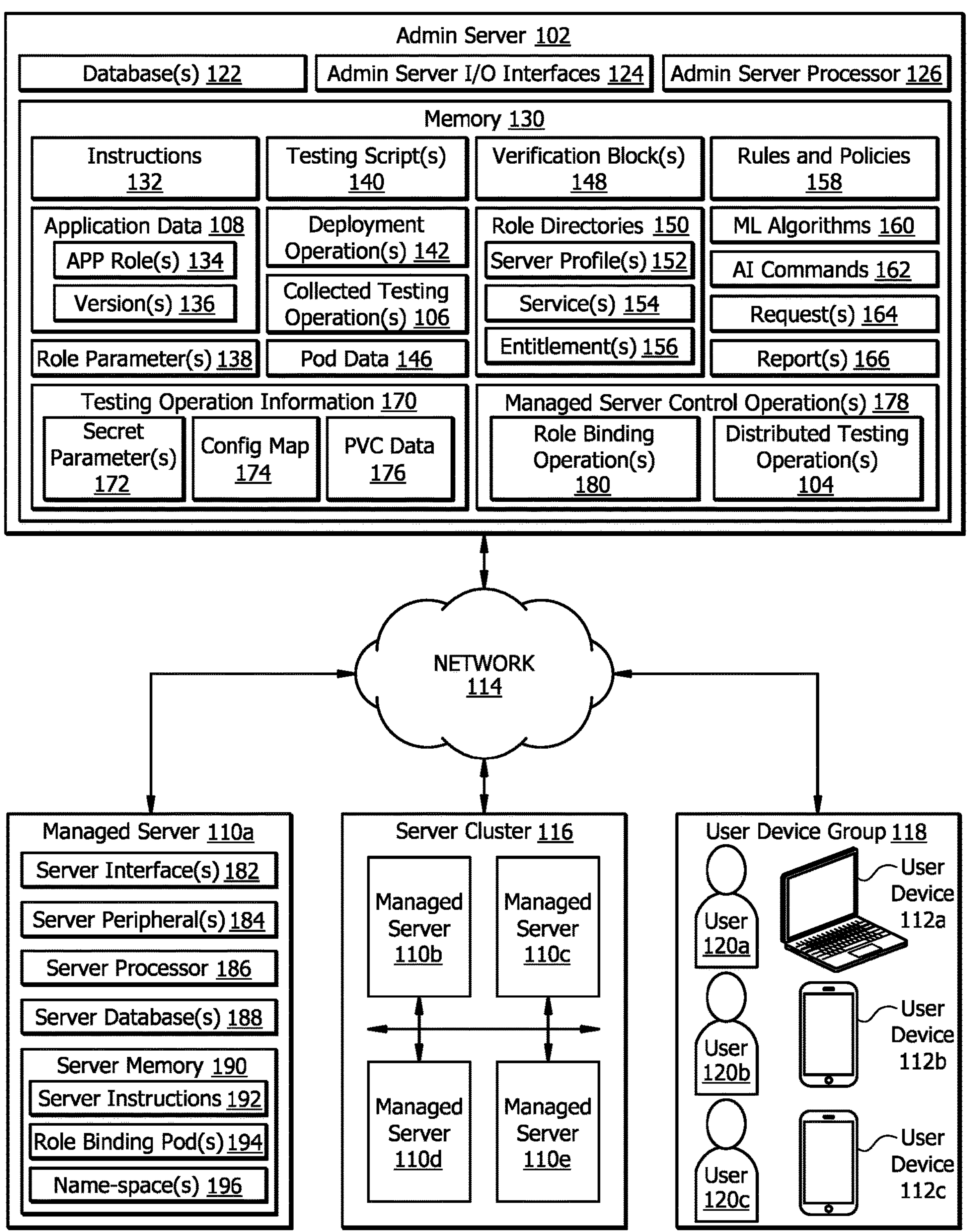
FIG. 1 illustrates a system in accordance with one or more embodiments.
Figure 2:
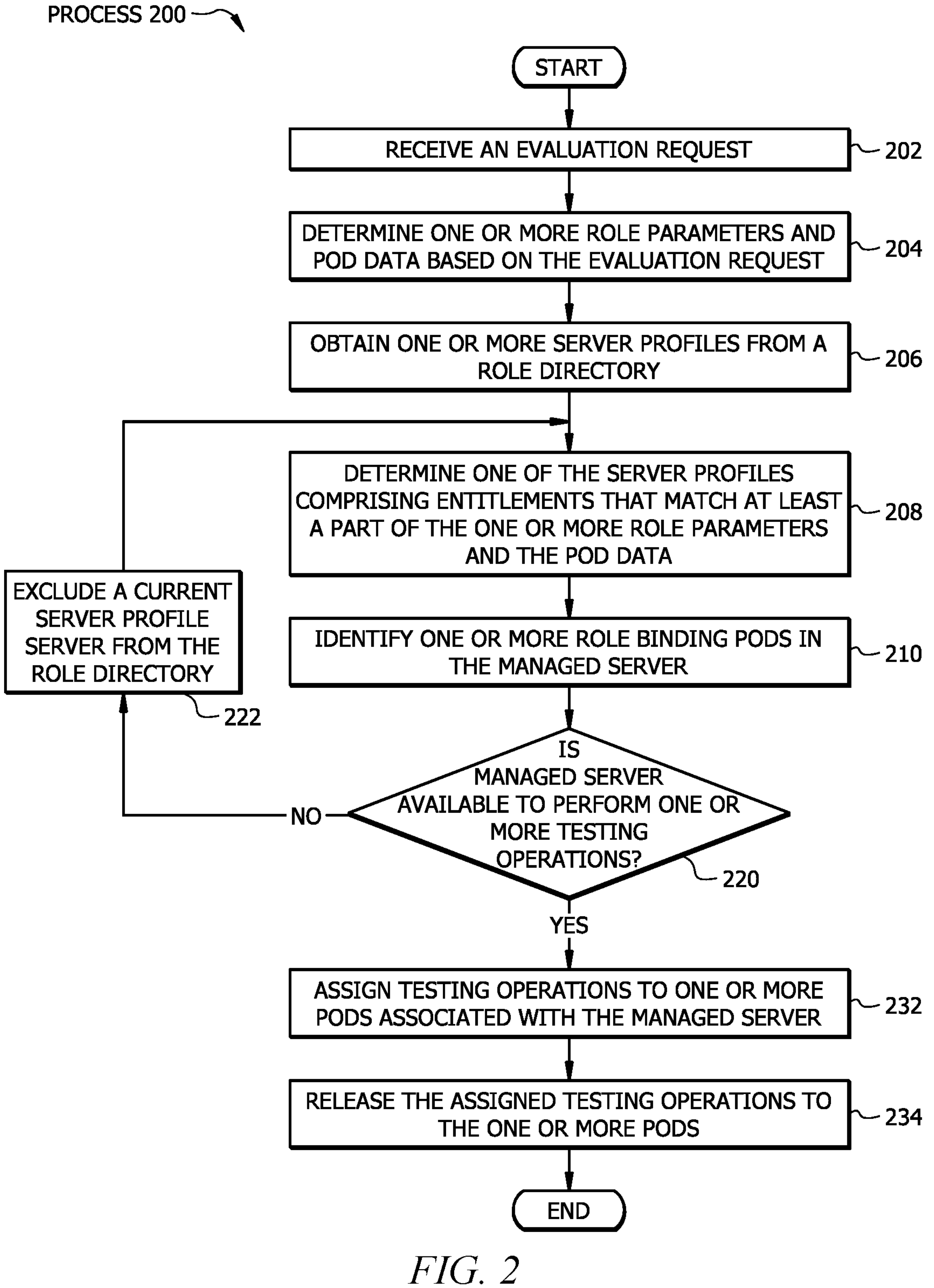
FIG. 2 illustrates an example flowchart of a method to dynamically configure cloud resources in accordance with one or more embodiments.
Figure 3:
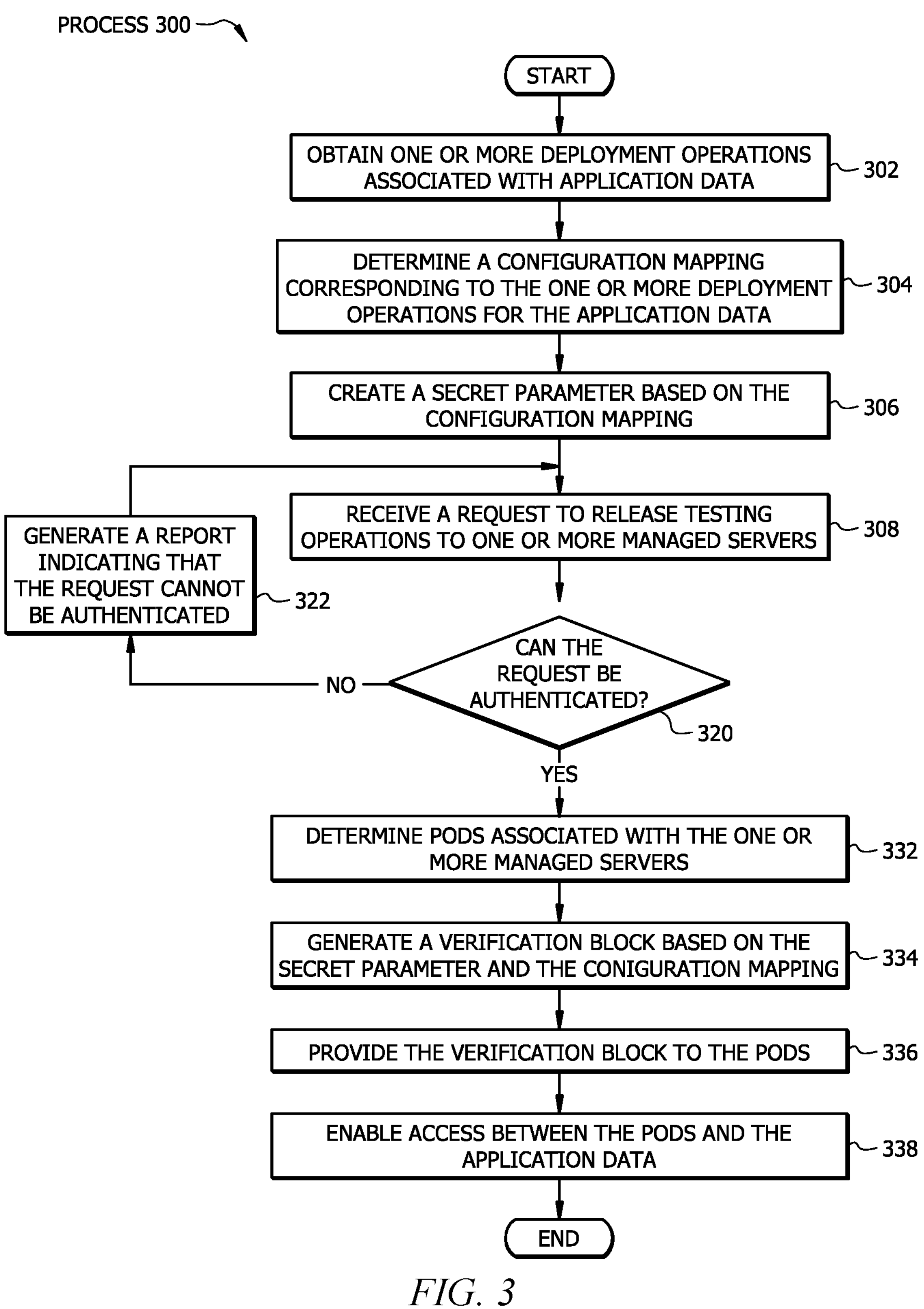
FIG. 3 illustrates an example flowchart of a method to dynamically manage access to network resources in accordance with one or more embodiments.
Figure 4:
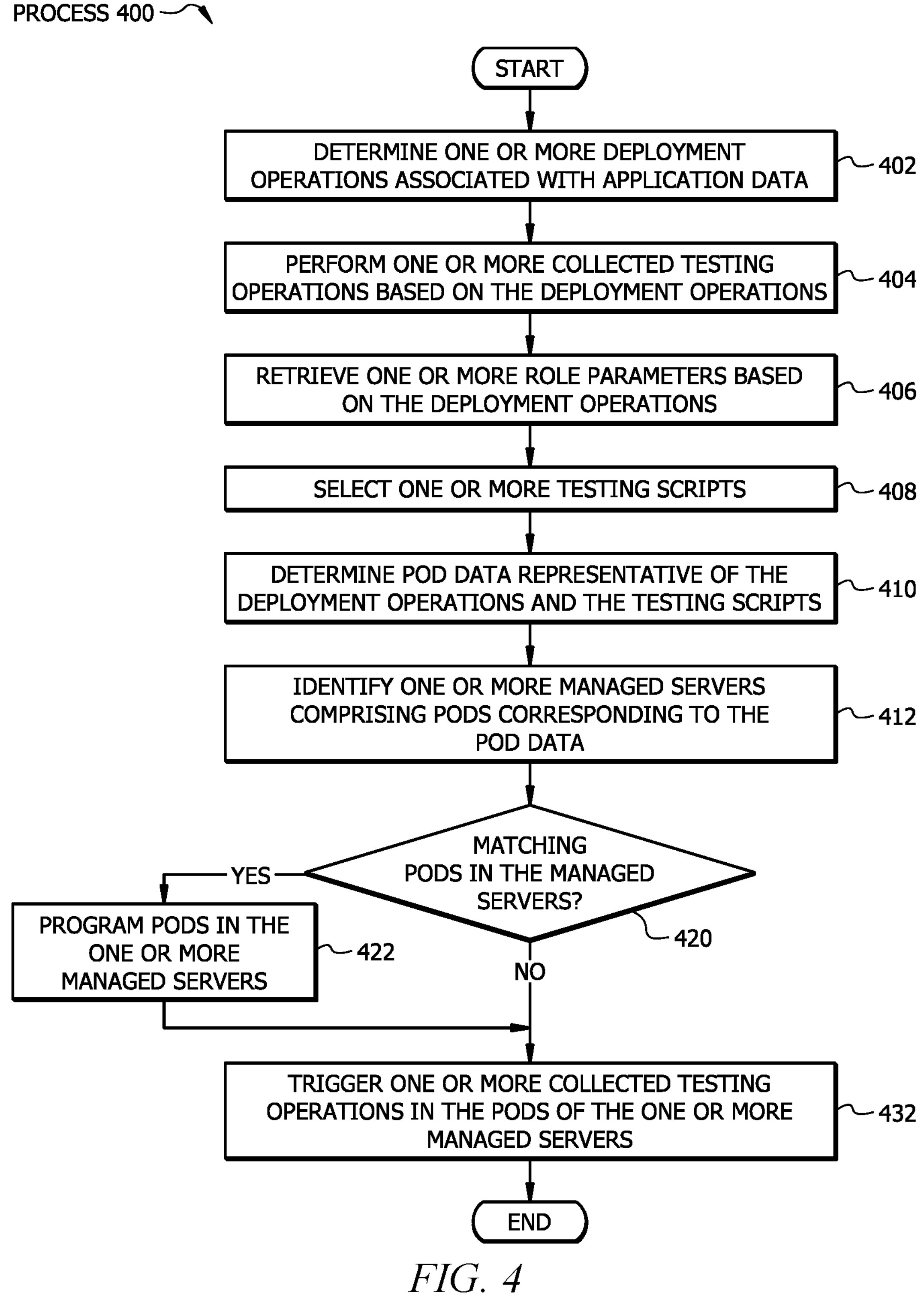
FIG. 4 illustrates an example flowchart of a method to dynamically maintain a distributed testing environment in accordance with one or more embodiments.

As described above, this disclosure provides various systems and methods configured to perform distributed testing operations and/or collected testing operations in a testing environment. FIG. 1 illustrates a system 100 in which an administration (admin) server 102 performs one or more distributed testing operations 104 and/or one or more collected testing operations 106. FIG. 2 illustrates a process 200 performed by the system 100 of FIG. 1 to dynamically configure cloud resources. FIG. 3 illustrates a process 300 performed by the system 100 of FIG. 1 to dynamically manage access to network resources. FIG. 4 illustrates a process 400 performed by the system 100 of FIG. 1 to dynamically maintain a distributed testing environment.

System Overview

FIG. 1 illustrates an example system 100, in accordance with one or more embodiments. The system 100 may be configured to perform one or more distributed testing operations and/or one or more collected testing operations 106 on one or more portions of application data 108. The system 100 includes an admin server 102 communicatively coupled to a managed server 110*a*, a managed server 110*b*, a managed server 110*c*, a managed server 110*d*, and a managed server 110 (collectively, managed servers 110) and/or a user device 112*a*, a user device 112*b*, and a user device 112*c* (collectively, user devices 112) via a network 114. The managed servers 110 may be an instructing nodes configured to control, monitor, and assign testing operations to other nodes. The managed servers 110 may be working nodes configured to receive instructions to perform one or more testing operations based on instructions received from the instructing node. In some embodiments, some of the managed servers 110 may be clustered together in a server cluster 116. Further, one or more of the user devices 112 may be grouped in a user device group 118. Each of the user devices 112 may be associated with one or more corresponding operators. The operators are shown as a user 120*a*, a user 120*b*, and a user 120*c* (collectively, users 120) in the user device group 118.

In one or more embodiments, the admin server 102 may comprise one or more databases 122, one or more admin server input (I)/output (O) interfaces 124, at least one admin server processor 126, and at least one memory 130 communicatively coupled to one another. In some embodiments, the memory 130 may comprise instructions 132, the application data 108 comprising one or more application roles 134 and one or more versions 136 of the application data 108, one or more role parameters 138, one or more testing scripts 140, one or more deployment operations 142, the one or more collected testing operations 106, pod data 146, one or more verification blocks 148, one or more role directories 150 comprising one or more server profiles 152, one or more services 154, and one or more entitlements 156, one or more rules and policies 158, one or more machine learning (ML) algorithms 160, one or more artificial intelligence (AI) commands 162, one or more requests 164, and one or more reports 166. Further, the memory 130 may be configured to store testing operations information 170 comprising one or more secret parameters 172, configuration mapping 174 (e.g., ConfigMap information elements), and Persistent VolumeClaim (PVC) data 176 and one or more managed server control operations 178 comprising one or more role binding operations 180 and the one or more distributed testing operations 104.

Referring to the managed server 110*a* a non-limiting example, the managed server 110 may comprise one or more server interfaces 182, one or more server peripherals 184, at least one server processor 186, one or more server databases 188, and at least one server memory 190 communicatively coupled to one another. The server memory 190 may comprise server instructions 192 and one or more pods 194 associated with one or more name-spaces 196.

System Components

Admin Servers

The admin server 102 is generally any device or apparatus that is configured to process data and communicate with computing devices (e.g., the managed servers 110 and the user devices 112), additional databases, systems, and the like, via the one or more admin server I/O interfaces 124 (i.e., a user interface or a network interface). The admin server 102 may comprise the admin server processor 126 that is generally configured to oversee operations of the processing engine. The operations of the processing engine are described further below in conjunction with the system 100 described in FIG. 1, the process 200 described in FIG. 2, the process 300 described in FIG. 3, and the process 400 described in FIG. 4.

The admin server 102 comprises multiple databases 122 configured to provide one or more memory resources to the admin server 102 and/or managed servers 110 and the user devices 112. The server 102 comprises the admin server processor 126 communicatively coupled with the databases 122, the admin server I/O interfaces 124, and the memory 130. The admin server 102 may be configured as shown, or in any other configuration. In one or more embodiments, the databases 122 are configured to store data that enables the admin server 102 to configure, manage and coordinate one or more middleware systems. In some embodiments, the databases 122 store data used by the admin server 102 to act as a halfway point in between one or more services 154 and other tools or databases.

In one or more embodiments, the admin server I/O interfaces 124 may be configured to enable wired and/or wireless communications. The admin server I/O interfaces 124 may be configured to communicate data between the admin server 102 and other user devices (i.e., the managed servers 110 or the user devices 112), network devices (i.e., routers in the network 114), systems, or domain(s) via the network 114. For example, the admin server I/O interfaces 124 may comprise a WI-FI interface, a LAN interface, a WAN interface, a modem, a switch, or a router. The admin server processor 126 may be configured to send and receive data using the admin server I/O interfaces 124. The admin server I/O interfaces 124 may be configured to use any suitable type of communication protocol. In some embodiments, the admin server I/O interfaces 124 may be an admin console comprising a web browser-based or graphical user interface used to manage a middleware server domain via the admin server 102. A middleware server domain may be a logically related group of middleware server resources that managed as a unit. A middleware server domain may comprise the admin server 102 and one or more managed servers 110. The managed servers 110 may be standalone devices (e.g., the managed server 110*a*) and/or collected devices in the server cluster 116 (e.g., managed servers 110*b*-110*e*). The server cluster 116 may be a group of managed servers that work together to provide scalability and higher availability for the services 154. In this regard, the services 154 are developed and deployed as part of at least one domain. In other embodiments, one instance of the managed servers 110 in the middleware server domain may be configured as the admin server 102. The admin server 102 provides a central point for managing and configure the managed servers 110, any of the one or more services 154, and the one or more pods 194.

The admin server processor 126 comprises one or more processors communicatively coupled to the memory 130. The admin server processor 126 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The admin server processor 126 may be a programmable logic device, a microcontroller, a microprocessor, or any suitable combination of the preceding. The one or more admin server processor 126 are configured to process data and may be implemented in hardware or software executed by hardware. For example, the admin server processor 126 may be 8-bit, 16-bit, 32-bit, 64-bit or of any other suitable architecture. The admin server processor 126 may include an arithmetic logic unit (ALU) for performing arithmetic and logic operations, processor registers that supply operands to the ALU and store the results of ALU operations, and a control unit that fetches the instructions 132 from the memory 130 and executes them by directing the coordinated operations of the ALU, registers and other components. In this regard, the one or more admin server processor 126 are configured to execute various instructions. For example, the one or more admin server processor 126 are configured to execute the instructions 132 to implement the functions disclosed herein, such as some or all of those described with respect to FIGS. 1-4. In some embodiments, the functions described herein are implemented using logic units, FPGAs, ASICs, DSPs, or any other suitable hardware or electronic circuitry.

In one or more embodiments, the admin server I/O interfaces 124 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The admin server I/O interfaces 124 may be configured to support any suitable type of communication protocol as would be appreciated by one of ordinary skill in the art.

The memory 130 may be volatile or non-volatile and may comprise a read-only memory (ROM), random-access memory (RAM), ternary content-addressable memory (TCAM), dynamic random-access memory (DRAM), and static random-access memory (SRAM). The memory 130 may be implemented using one or more disks, tape drives, solid-state drives, and/or the like. The memory 130 is operable to store the instructions 132, the one or more entitlements 156, the server profiles 152 corresponding to one or more managed servers 110 and in association with the one or more entitlements 156 for each server profile 152, the rules and policies 158, the one or more services 154, the one or more deployment operations 142, the one or more collected testing operations 106, the application data 108, the one or more role parameters 138, the pod data 146, the one or more testing scripts 140, the one or more verification blocks 148, the ML algorithms 160, the AI commands 162, the requests 164, the reports 166, the testing operation information 170, the managed server control operations 178, and/or any other data or instructions. The instructions 132 may comprise any suitable set of instructions, logic, rules, or code operable to execute the admin server processor 126.

The application data 108 may comprise information associated with one or more services 154. The application data 108 may be configured to track and/or maintain one or more application roles 134 and one or more versions 136 of a given application and or service 154.

In this regard, the application data 108 may comprise the one or more portions. Each portion may indicate specific functions of an application to be tested. The one or more application roles 134 may be one or more operations that a given service 154 is expected to perform. As a non-limiting example, a first service 154 may comprise a first application role 134 in which the application retrieves user information from the databases and a second application role 134 in which the application generates one or more reports 166. In another non-limiting example, a second service 154 may comprise a third application role 134 in which the application is configured to determine a location of a user on Earth and a fourth application role 134 in which the application trains one or more machine learning (ML) operations. The one or more versions 136 may be impressions and/or copies of the services 154 at one or more moments in time. The versions 136 may be one or more builds of an application and or service 154 at any given moment in time.

The one or more role parameters 138 may be information configured to modify the application data 108. In particular, the role parameters 138 may associate one or more of the versions 136 with a specific deployment schedule and/or one or more deployment operations 142. The role parameters 138 may be updated dynamically and/or periodically over time by commands received by the admin server 102 from the one or more admin server I/O interfaces 124 and/or retrieved from the one or more databases 122. The role parameters 138 may be configured to indicate one or more testing operations (e.g., the distributed testing operations 104 and/or the collected testing operations 106) corresponding to any of the portions of the application data 108. In some embodiments, the admin server 102 may be configured to determine whether the entitlements 156 at least partially match the role parameters 138. If the entitlements 156 at least partially match the role parameters 138, the admin server 102 may be configured to identify one or more managed servers 110 associated with a server profile configured to perform one or more testing operations.

The one or more testing scripts 140 may be one or more sets of instructions 132 configured to assign one or more distributed testing operations 104 and/or collected testing operations 106. The testing scripts 140 may be configured to trigger one or more testing operations in the system 100. For example, the testing scripts 140 may provision the managed servers 110 to perform one or more of the testing operations. The testing scripts 140 may be automatically triggered as one of the one or more deployment operations 142. In some embodiments, the testing scripts 140 may be configured to trigger control of one or more of the versions 136 over time for specific application data 108.

The one or more deployment operations 142 may be one or more operations configured to provide triggers in the form of communication or control signals to start operations such as fetching the instructions 132 or running one or more of the test scripts 140. The deployment operations 142 may provide service information data indicating any services 154 available in the admin server 102 and the managed servers 110. The deployment operations 142 may be configured to provide lists, security information, and configuration parameters that the admin server 102 uses to set up a specific service 154. The deployment operations 142 may be configuration data that provides starting procedure configuration to the admin server 102. In one or more embodiments, the deployment operations 142 may be optimized instructions that enable establishing of a specific procedure in the middleware server domain. In the example of FIG. 1, the deployment operations 142 comprise performing application installation operations configured to install multiple middleware scripts the admin server 102.

The distributed testing operations 104 may be one or more testing operations configured to be performed at multiple locations. The distributed testing operations 104 may be testing operations distributed to one or more pods 194 associated with one or more managed servers 110. The distributed testing operations 104 may be distributed in multiple locations physically separated from one another. The distributed testing operations 104 may be testing operations performed to evaluate one or more portions of the application data 108. The distributed testing operations 104 may be configured to be performed sequentially such that first testing operations are performed before second testing operations. The second testing operations may be performed based on one or more results of the first testing operations. The distributed testing operations 104 may be configured to be performed simultaneously such that the first testing operations are performed at a same time that the second testing operations are performed. In some embodiments, the distributed testing operations 104 may be performed at multiple pods 194 in a same name-space 196. The distributed testing operations 104 may be performed at one or more pods 194 associated with multiple managed servers 110.

The collected testing operations 106 may be one or more testing operations configured to be performed at a central location. The collected testing operations 106 may be testing operations collected in one or more pods 194 associated with one or more managed servers 110. The collected testing operations 106 may be testing operations performed to evaluate one or more portions of the application data 108. The collected testing operations 106 may be configured to be performed sequentially such that first testing operations are performed before second testing operations. The second testing operations may be performed based on one or more results of the first testing operations. The collected testing operations 106 may be configured to be performed simultaneously such that the first testing operations are performed at a same time that the second testing operations are performed. In some embodiments, the collected testing operations 106 may be performed at multiple pods 194 in a same name-space 196. The collected testing operations 106 may be performed at one or more pods 194 associated with a single managed server 110.

The pod data 146 may be information associated with the memory resources and/or processing resources of the pods 194 at the managed servers 110. The pod data 146 may be information indexing one or more testing capabilities of one or more user devices 112 associated with a given managed server 110. In some embodiments, the pod data 146 may indicate one or more testing characteristics of a given pod 194. The testing characteristics may information configured to indicate whether a pod 194 is configured to evaluate and/or test a specific portion of the application data 108.

The one or more verification blocks 148 may be configured to provide verification information between the admin server 102 and one of the managed servers 110. The verification blocks 148 may be sets of data, strings of alphanumeric characters, a passphrase, a passcode, or any combination thereof. The verification blocks 148 may be shared by the admin server 102 to the managed servers 110 to enable the managed servers 110 to access one or more portions of the application data 108. In some embodiments, a specific managed servers 110 may be configured to receive one or more verification blocks 148 upon confirming that a given pod 194 is associated with the specific managed server 110. Upon receiving the verification block 148, the specific managed server 110 may be configured to retrieve one or more portions of the application data 108 to perform one or more of the testing operations in the one or more portions.

The role directories 150 may comprise the one or more server profiles 152, one or more services 154, and one or more entitlements 156. In one or more embodiments, the server profiles 152 may comprise multiple profiles for the managed servers 110. Each server profile 152 may be associated with one or more entitlements 156. The entitlements 156 may indicate that a given managed server 110 is allowed to access one or more network resources in accordance with the one or more rules and policies 158. The entitlements 156 may indicate that a given managed server 110 is allowed to perform one or more operations in the system 100 (e.g., provide a specific application data access to one of the user devices 112). To secure or protect operations of the managed servers 110 from bad actors, the entitlements 156 may be assigned to a given server profile 152 in accordance with updated security information, which may provide guidance parameters to the use of the entitlements 156 based at least upon corresponding rules and policies 158. In one or more embodiments, the one or more services 154 are access to one or more application operations performed in accordance with the application data 108. The one or more services 154 may be accessed by one or more of the managed servers 110 based on access granted by the verification blocks 148.

The rules and policies 158 may be security configuration commands or regulatory operations predefined by an organization or one or more users 120. In one or more embodiments, the rules and policies 158 may be dynamically defined by the one or more users 120. The rules and policies 158 may be prioritization rules configured to instruct one or more managed servers 110 to perform one or more testing operations or perform one or more operations in the system 100 in a specific request 164. The one or more rules and policies 158 may be predetermined or dynamically assigned by a corresponding user 120 or an organization associated with the user 120.

In one or more embodiments, the ML algorithm 160 may be executed by the admin server processor 126 to evaluate the requests 164. Further, the ML algorithm 160 may be configured to interpret and transform the testing operation information 170 and/or the managed server control operations 178 into structured data sets and subsequently stored as files or tables. The ML algorithm 160 may cleanse, normalize raw data, and derive intermediate data to generate uniform data in terms of encoding, format, and data types. The ML algorithm 160 may be executed to run user queries and advanced analytical tools on the structured data. The ML algorithm 160 may be configured to generate the one or more AI commands 162 based on one or more results of the testing operations. The AI commands 162 may be parameters that proactively modify the application data 108 and/or the role parameters 138. The AI commands 162 may be combined with the existing instructions 132 to dynamically modify access to one or more portions of the application data 108.

The testing operation information 170 may comprise one or more secret parameters 138, configuration mapping 174, and/or PVC data 176. The testing operation information 170 may be configured to train the ML algorithms 160 and/or to be at least partially controlled by the AI commands 162. In some embodiments, the testing operation information 170.

The admin server 102 may be configured to create the verification blocks 148 based on the one or more secret parameters 172, the configuration mapping 174, and the PVC data 176. The secret parameters 172, the configuration mapping 174, and the PVC data 176 may be configured to control access to the verification blocks 148. The secret parameters 172, the configuration mapping 174, and the PVC data 176 may be information parameters and/or information elements configured to trigger specific operations in a containerized environment.

In one or more embodiments, the secret parameters 172 may be credentials that enable access to the application data 108 via the verification blocks 148. The secret parameters 172 may be an object configured to contain sensitive data such as a password, a token, or a key. In some embodiments, the secret parameters 172 may be created independently of the pods 194. As a result, there is less risk to expose the secret parameters 172 (and associated data) during workflow of creating, viewing, and editing the pods 194. The secret parameters 172 may be mounted as data volumes or exposed as environment variables to be used by a container in a pod 194. The secret parameters 172 may be used by other parts of the system 100, without being directly exposed to the pods 194. For example, the secret parameters 172 may hold credentials that other parts of the system 100 may use to interact with external systems.

The configuration mapping 174 may be an information element (e.g., information element ConfigMap) configured to indicate access to a specific directory of the pods 194, a cluster of the pods 194, and/or a group of files. The configuration mapping 174 may be an Application Programming Interface (API) object used to store data in key-value pairs. The pods 194 may receive the configuration mapping 174 as environment variables, command-line arguments, or as configuration files in a volume. The configuration mapping 174 may allow decoupling of environment-specific configurations from container images, so that services 154 (e.g., applications) are easily portable. The configuration mapping 174 may configure a container inside the pods 194 inside a container command and/or one or more environment variables for a container among others.

The PVC data 176 may be an information structure (e.g., Persistent VolumeClaim storage) configured to indicate a request for storage in a given cluster. The PVC data 176 may be a request for storage. In some embodiments, the PVC data 176 may request specific size and access modes in a container. The PVC data 176 may allow consumption of abstract storage resources. The PVC data 176 may be configured differently to handle different application data 108.

In one or more embodiments, the managed server control operations 178 may comprise one or more role binding operations 180 and the one or more distributed testing operations 104. The managed server control operations 178 may be operations performed by the admin server 102 to control access between the managed servers 110 and the application data 108 and/or the databases 122. In some embodiments, the application data 108 and/or the databases 122 may be network resources and/or cloud resources. The role binding operations 180 may be one or more operations in which the application roles 134 are defined by one or more of the portions of the application data 108. Further, the role binding operations 180 may comprise relating the one or more pods 194 in the managed servers 11 to one or more specific application roles 134. In turn, the role binding operations 180 may be configured to bind any of the user devices 112 to perform specific application roles 134 in any of the pods 194.

In one or more embodiments, as newer versions 136 of the application data 108 is created, the admin server 102 may be configured to perform one or more distributed testing operations 104 configured to executed unit test, deploy, scan through a container image and deploy into respective environments. In some embodiments, one of the managed servers 110 acting as an instructing node (e.g., API server) may receive the deployed testing operations. In turn, the managed server 110 acting as the instructing node may check for one or more available managed servers acting as worker nodes comprising pods 194 that at least partially match the pod data 146. If the pods 194 of a given worker node match the pod data 146 associated with one or more application roles 134 of the newer version 136, then distributed testing operations 104 may be assigned to the given worker node. If the pods 194 of the given worker node do not match the pod data 146 associated with one or more application roles 134 of the newer version 136, then distributed testing operations 104 may be assigned to the given worker node. The secret parameters 172, the configuration mapping 174, and the PVC data 176 may be initialized during runtime of a test application (e.g., specific application data 108).

In some embodiments, the configuration mapping 174 is configured to hold global parameters that stored into the PVC data 176 along the PVC data 176. The pod data 146 may be updated and/or created as access is allocated during initialization of the managed server acting as the instructing node. The managed servers 110 acting as the worker nodes and the managed server 110 acting as the instructing node may be communicatively coupled to the admin server 102 via wired and/or wireless connections in the network 114.

In one or more embodiments, the databases 122 may be one of the server databases 188 in one of the managed servers 110. In one example, the admin server 102 may determine the admin server processor 126 is available (e.g., running) to perform a specific service 154. In another example, the admin server 102 may determine that a specific managed server 110 is running to enable a testing application and/or perform the specific service 154 upon receiving a server response indicating that a corresponding managed server 110 is available to perform the service 154. In one or more embodiments, the admin server 102 may determine whether the server processor 186 is available (e.g., running) to perform the one or more testing operations. In yet another example, the admin server 102 may determine that the databases 122 are running to provide memory resources to execute the test application and/or the services 154 upon receiving a database response indicating that the databases 122 are available to provide memory resources to execute the services 154. In one or more embodiments, the admin server 102 may determine whether the databases 122 are available (e.g., running) and may provide the database response. In one or more embodiments, one of the managed servers 110 may determine whether the corresponding server databases 188 are available (e.g., running) and may provide the database response.

Managed Servers

In some embodiments, the managed servers 110 may be configured to perform one or more of the operations described in reference to the admin server 102. As described above, the managed servers 110 may comprise the one or more server interfaces 182, the one or more server peripherals 184, the at least one server processor 186, the one or more server databases 188, and the at least one server memory 190 communicatively coupled to one another. Further, the server memory 190 may comprise the server instructions 192 and the one or more pods 194 associated with the one or more name-spaces 196.

The managed servers 110 may be hardware configured to create, transmit, and/or receive information. The managed servers 110 may be configured as an instructing node or as worker nodes. The managed servers 110 may be configured to receive inputs from a user, process the inputs, and generate data information or command information in response. The data information may include documents or files generated using a graphical user interface (GUI). The command information may include input selections/commands triggered by a user using a peripheral component or one or more server peripherals 184 (i.e., a keyboard) or an integrated input system (i.e., a touchscreen displaying the GUI). The managed servers 110 may be communicatively coupled to the admin server 102 via a network connection (i.e., the server peripherals 184). The managed servers 110 may transmit and receive data information, command information, or a combination of both to and from the admin server 102 via the server interfaces 182. In one or more embodiments, the managed servers 110 are configured to exchange data, commands, and signaling with the admin server 102. In some embodiments, the managed servers 110 are configured to receive at least one firewall configuration from the admin server 102 to implement a firewall (one of the one or more local applications) at one of the managed servers 110.

In one or more embodiments, the server interfaces 182 may be any suitable hardware or software (e.g., executed by hardware) to facilitate any suitable type of communication in wireless or wired connections. These connections may comprise, but not be limited to, all or a portion of network connections coupled to additional managed servers 110, the user devices 112, the admin server 102, the Internet, an Intranet, a private network, a public network, a peer-to-peer network, the public switched telephone network, a cellular network, a LAN, a MAN, a WAN, and a satellite network. The server interfaces 182 may be configured to support any suitable type of communication protocol.

In one or more embodiments, the one or more server peripherals 184 may comprise audio devices (e.g., speaker, microphones, and the like), input devices (e.g., keyboard, mouse, and the like), or any suitable electronic component that may provide a modifying or triggering input to the managed servers 110. For example, the one or more server peripherals 184 may be speakers configured to release audio signals (e.g., voice signals or commands) during media playback operations. In another example, the one or more server peripherals 184 may be microphones configured to capture audio signals. In one or more embodiments, the one or more server peripherals 184 may be configured to operate continuously, at predetermined time periods or intervals, or on-demand.

The server processor 186 may comprise one or more processors communicatively coupled to and in signal communication with the server interfaces 182, the server peripherals 184, and the server memory 190. The server processor 186 is any electronic circuitry, including, but not limited to, state machines, one or more CPU chips, logic units, cores (e.g., a multi-core processor), FPGAs, ASICs, or DSPs. The server processor 186 may be a programmable logic device, a microcontroller, a microprocessor, or any suitable combination of the preceding. The one or more processors in the server processor 186 are configured to process data and may be implemented in hardware or software executed by hardware. For example, the server processor 186 may be an 8-bit, a 16-bit, a 32-bit, a 64-bit, or any other suitable architecture. The server processor 186 may comprise an ALU to perform arithmetic and logic operations, processor registers that supply operands to the ALU, and store the results of ALU operations, and a control unit that fetches software instructions such as server instructions 192 from the server memory 190 and executes the server instructions 192 by directing the coordinated operations of the ALU, registers, and other components via a device processing engine (not shown). The server processor 186 may be configured to execute various instructions.

The server memory 190 may comprise multiple operation data and one or more local applications associated with the managed server 110. The operation data may be data configured to enable one or more data processing operations such as those described in relation with the admin server 102. The operation data may be partially or completely different from those comprised in the memory 130. The local applications may be one or more of the services 154 described in relation with the admin server 102. In some embodiments, the local applications may be partially or completely different from those comprised in the memory 130.

In one or more embodiments, the pods 194 are deployable units of computing that are created and managed in a containerized environment. The pods 194 may be configured as redundancies of one another or as standalone portions of a wireless communication network. The pods 194 may comprise one or more containers (e.g., one or more container clusters) with shared storage and network resources. The shared storage and network resources may be co-located and co-scheduled. The network resources may be power resources, memory resources, and processing resources that are consumed in attempts to access the services 154 in a given communication system 100. The one or more name-spaces 196 may be hierarchical multi-tenant Kubernetes clusters. In particular, the system 100 may comprise a multi-core network configured to support services associated with multiple tenants. In this regard, the core network may comprise multiple cores may reside in a multi-cloud environment. A cluster may comprise multiple nodes in the core network that execute containerized services and applications. A name-space may comprise a containment space or environment created to hold reference, indicator, and/or identifier symbols (e.g., names). An identifier associated with a namespace may be associated only with that namespace.

Network

The network 114 facilitates communication between and amongst the various devices of the system 100. The network 114 may be any suitable network operable to facilitate communication between the admin server 102, the one or more managed servers 110, and the user devices 112 of the system 100. The network 114 may include any interconnecting system capable of transmitting audio, video, signals, data, data packets, messages, or any combination of the preceding. The network 114 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

User Device

In one or more embodiments, each of the user devices 112 (e.g., the user devices 112_a_-112_c_) may be any computing device configured to communicate with other devices, such as the admin server 102, other user devices 112 in the user device group 118, databases, and the like in the system 100. Each of the user devices 112 may be configured to perform specific functions described herein and interact with one or more managed servers 110 and any other user devices 112 in the user device group 118. Examples of the user devices 112 comprise, but are not limited to, a laptop, a computer, a smartphone, a tablet, a smart device, an IoT device, a simulated reality device, an augmented reality device, or any other suitable type of device. The requests 164 may be provided by the user devices 112 via one or more interfaces comprising input displays, voice microphones, or sensors capturing gestures performed by a corresponding user 120.

Operational Flow

In one or more embodiments, the admin server 102 may be configured to trigger parallel testing of one or more portions of the application data 108. The testing operations may be performed in a cloud platform. The testing operations may be integrated and continued delivery. In some embodiments, the testing operations may be assigned to specific pods 194 to perform parallel testing. The testing operations may be executed in accordance with one or more assigned roles. The testing operations may be provided from the admin server 102 and/or a managed server 110 operating as an instructing node to one or more managed servers 110 operating as worker nodes. In one or more embodiments, the admin server 102 and/or the managed server 110 operating as the instructing node may be configured to execute the one or more testing scripts 140 to assign one or more testing operations to the managed servers 110 operating as the worker nodes. The managed servers 110 may comprise one or more pods 194 configured to perform one or more testing operations matching one or more of the application roles 134.

In one or more embodiments, the managed servers 110 operating as worker nodes are interconnected with the pods 194 where application details are maintained in the PVC data 176. The pods 194 may be related to PVC storage, storage size, and corresponding permissions. In some embodiments, the requests 164 may be configured to be authenticated (e.g., security based Authentication (x509 cert and ldap)). The authentication may be performed on any request 164 to determine whether the request 164 is received from a trusted device (e.g., authentic). In one or more embodiments, the role binding operations 180 may be configured to dynamically associate portions of the application data 108 to one or more versions 136 and the pod data 146. In this regard, the role binding operations 180 may be configured to enable runtime reconfiguration of an executing service to act as a trigger and key enabler of testing operations. The testing operations may alternate between the distributed testing operations 104 and the collected testing operations 106.

In one or more embodiments, if a managed server 110 is not available during assignment of testing operations, the admin server 102 and/or the managed server 110 operating as an instructing node may be configured to program one or more pods 194 in one or more additional managed servers 110 operating as worker nodes to perform the one or more testing operations. The pods 194 may be dynamically programmed to perform one or more testing operations to prevent testing downtime in the system 100.

Example Processes

FIGS. 2-4 illustrate examples flowcharts of a process 200, a process 300, and a process 400, respectively. The process 200 may be configured to dynamically configure cloud resources in a testing environment, in accordance with one or more embodiments. The process 300 may be configured to dynamically manage access to network resources in the testing environment, in accordance with one or more embodiments. The process 400 may be configured to dynamically maintain a distributed testing environment, in accordance with one or more embodiments. Modifications, additions, or omissions may be made to the process 200, the process 300, and the process 400. The process 200, the process 300, and the process 400 may comprise more, fewer, or other operations than those shown in FIGS. 2-4, respectively. For example, operations may be performed in parallel or in any suitable order. While at times discussed as the server 102, the managed servers 110, the user devices 112, or components of any of thereof performing operations described in operations 202-234 in the process 200, operations 302-338 in the process 300, and operations 402-432 in the process 400, any suitable system or components of the system 100 may perform one or more operations of the process 200, the process 300, and/or the process 400. For example, one or more operations of the process 200 may be implemented, at least in part, in the form of instructions 132 of FIG. 1, stored on non-transitory, tangible, machine-readable media (e.g., a non-transitory computer readable medium such as the server memory 130 of FIG. 1) that when run by one or more processors (e.g., the admin server processor 126 of FIG. 1) may cause the one or more processors to perform operations described in operations 202-234. In some embodiments, while one or more of the operations of the process 200, the process 300, and/or the process 400 are described as being performed by the admin server 102, a managed server 110 operating as an instructing node may be configured to perform any of the operations described in reference to the admin server 102.

Process to Dynamically Configure Cloud Resources

FIG. 2 illustrates an example flowchart of a process 200 configured to dynamically configure cloud resources, in accordance with one or more embodiments. In one or more embodiments, the process 200 is configured to perform parallel testing in managed servers 110 operating as worker nodes (associated with one or more user devices 112). The process 200 may be configured to enable the parallel testing of application data 108 in multiple worker nodes. The worker nodes may comprise pods 194 that are interconnected and comprise one or more user sessions configured to access details of an application which are maintained in the PVC data 176. The pods 194 may be configured with specifies attributes of PVC storage, storage size, and permissions relating to the application. A request for testing the application may undergo a security based authentication (e.g., x509 cert and ldap) before providing the pods 194 with the access details. The security based authorization may comprise determining role (e.g., application roles 134) and rolebinding parameters (e.g., role parameters 138) associated with each worker node to configure relevant properties of the application dynamically. The user sessions may be granted role-specific access to the application for testing.

The process 200 starts at operation 202, where the admin server 102 receives an evaluation request 164. The admin server 102 may receive an evaluation request for one or more portions of the application data 108. At operation 204, the admin server 102 is configured to determine one or more role parameters 172 and pod data 146 based on the evaluation request 164. The admin server 102 may be configured to determine one or more role parameters 172 configured to indicate testing operations corresponding to a portion of the application data 108. The application data 108 may comprise multiple portions. In this regard, each portion may indicate one or more specific functions of an application to be tested. At operation 206, the admin server 102 is configured to obtain one or more server profiles 152 from a role directory 150. The admin server 102 may be configured to obtain a server profile 152 from one or more role directories 150 associated with one or more entitlements 156 that indicate access to portions of the application data 108. The admin server 102 may be configured to determine whether the entitlements 156 at least partially match one or more of the role parameters 138. At operation 208, the admin server 102 is configured to determine one of the server profiles 152 comprising entitlements 156 that match at least a part of the one or more role parameters 138 and/or the pod data 146. At operation 210, the admin server 102 is configured to identify one or more pods 194 in the managed servers 110 that are configured to perform one or more of the testing operations corresponding to specific portions of the application data 108. At operation 220, the admin server 102 is configured to determine whether the managed server is available to perform one or more testing operations. If the admin server 102 determines that there are no available managed servers 110 to perform one or more testing operations (e.g., NO), the process 200 proceeds to operation 222. If the admin server 102 determines that there are available managed servers 110 to perform one or more testing operations (e.g., YES), the process 200 proceeds to operation 232. In some embodiments, in response to determining that the entitlements 156 at least partially match the role parameters 138, the admin server 102 may be configured to identify pods 194 in at least one of the pods 194 in a managed server 110 associated with the server profile 152.

At operation 222, the admin server 102 is configured to exclude a current server profile 152 from the role directory 150. In particular, the managed server 110 operating as a worked node may be determined to lack programming to perform the one or more testing operations. At operation 232, the admin server 102 is configured to assign testing operations to one or more pods 194 associated with the managed server 110. The process 200 may end at operation 234, where the admin server 102 may be configured to release the assigned testing operations to the one or more pods 194. In this regard, the pods 194 are configured to perform the testing operations for the specific portions of the application data 108 for a dynamically updated or predefined amount of time.

Process to Dynamically Manage Access to Network Resources

FIG. 3 illustrates an example flowchart of a process 300 to dynamically manage access to network resources, in accordance with one or more embodiments. In one or more embodiments, the process 300 is configured to dynamically manage access to application resources (e.g., portions of the application data 108) in a network. The process 300 may be configured to map one or more testing operations of a given service 154 to respective DNS. The process 300 comprises using one or more secret parameters 172, a configuration mapping 174, and configuration files to assign and/or reassign dynamic properties to individual worker nodes. The admin server 102 may be configured to store scripts for testing and configuration parameters to connect with Git, the test scripts 140, and/or configurations. The admin server 102 may be configured to connect to a build queue to copy a new build (e.g., new version 136) of the application data dynamically or periodically.

The process 300 proceeds to operation 302, where the admin server 102 obtains one or more deployment operations 142 associated with the application data 108. At operation 304, the admin server 102 is configured to determine a configuration mapping 174 corresponding to the one or more deployment operations 142 for the application data 108. The admin server 102 may be configured to determine the configuration mapping 174 corresponding to each of the one or more deployment operations 142 to control access to one or more portions of the application data 108. At operation 306, the admin server 102 is configured to create a secret parameter 172 based on the configuration mapping 174. The admin server 102 may be configured to create a secret parameter 172 based at least in part upon the configuration mapping 174. The secret parameter 172 may indicate secured information associated with at least a portion of the application data 108. At operation 308, the admin server 102 is configured to receive a request 164 to release testing operations to one or more managed servers 110. At operation 320, the admin server 102 is configured to determine whether the request 164 can be authenticated. In this regard, the admin server 102 may be configured to identify a source of the request 164 and determine whether the source at least partially matches one or more server profiles 152 in a role directory 150. If the admin server 102 determines that the request 164 cannot be authenticated (e.g., NO), the process 300 proceeds to operation 322. If the admin server 102 determines that the request 164 can be authenticated (e.g., YES), the process 300 proceeds to operation 332.

At operation 322, the admin server 102 is configured to generate a report 166 indicating that the request cannot be authenticated. At operation 332, the admin server 102 is configured to determine pods 194 associated with the managed servers 110. At operation 334, the admin server 102 is configured to generate a verification block 148 based at least in part upon the secret parameter 172 and the configuration mapping 174. At operation 336, the process 300 may be configured to provide the verification block 148 to the pods 194. The process 300 may end at operation 338, where the admin server 102 may be configured to enable access between the pods 194 and the application data 108. In this regard, the admin server 102 may be configured to provide the verification block 148 to the pods 194 and enable access between the pods 194 and the portion of the application data 108.

Process to Dynamically Maintain a Distributed Testing Environment

FIG. 4 illustrates an example flowchart of a process 400 to dynamically maintain a distributed testing environment, in accordance with one or more embodiments. In one or more embodiments, the process 400 may be configured to perform testing operations in a distributed testing environment. The process 400 may be configured to dynamically update user sessions in a multi-cluster environment. The multi-cluster environment may be a fully automated testing environment with functional test case execution. The process 400 may comprise version control continuous integration, continuous delivery, continuous deployment, and distributed testing of the application builds. The distributed nature of the testing environment enables worker nodes to be replaced in real-time during testing operations thereby preventing, reducing, and/or eliminating interruptions (e.g., downtime) during the testing operations. For example, the distributed network may dynamically enable a second set of worker nodes configured to test specific aspects of an application in an event that a first set of worker nodes loses connectivity due to an unexpected event (e.g., power outage).

The process 400 proceeds to operation 402, where the admin server 102 determines one or more deployment operations 142 associated with the application data 108. The admin server 102 may be configured to determine a deployment operation 142 associated with a portion of one or more portions of application data 108. At operation 404, the admin server 102 is configured to perform one or more collected testing operations based on the deployment operations 142. The admin server 102 is configured to perform one or more collected testing operations for the portion of the application data 108 based at least in part upon the deployment operation 142. At operation 406, the admin server 102 is configured to retrieve one or more role parameters 138 based on the deployment operations 142. The admin server 102 is configured to determine pod data 146 indicating one or more role parameters 138 based at least in part upon the deployment operation 142. The role parameters 138 may be configured to indicate one or more testing operations on the portion of the application data 108. At operation 408, the admin server 102 is configured to select one or more testing scripts. At operation 410, the admin server 102 is configured to determine pod data 146 representative of the deployment operations 142 and the testing scripts 140. The admin server 102 may be configured to identify at least one pod 194 that at least partially matches the pod data 146. At operation 412, the admin server 102 is configured to identify one or more managed servers 110 comprising pods 194 corresponding to the pod data 146. At operation 420, the admin server 102 is configured to determine whether the managed servers 110 comprise the identified pods 194. If the admin server 102 determines that the managed servers 110 comprise the pods 194 (e.g., YES), the process 400 proceeds to operation 422. If the admin server 102 determines that the managed servers 110 comprise the pods 194 (e.g., NO), the process 400 proceeds to operation 432.

At operation 422, the admin server 102 is configured to program the pods 194 in the one or more managed servers 110. The pod 194 may be configured to enable access between the portion of the application data 108 and one or more users 120. The process 300 may end at operation 432, where the admin server 102 may be configured to trigger one or more collected testing operations in the pods 194 of the one or more managed servers 110.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:
a memory configured to store:
a plurality of deployment operations configured to control access to one or more portions of application data; and
a processor communicatively coupled to the memory and configured to:
receive a request to release testing operations to one or more managed servers;
identify a source of the request;
obtain one or more server profiles from a role directory;
determine whether the source at least partially matches at least one server profile of the one or more server profiles;
in response to determining that the source does not at least partially match the at least one server profile, generate a report indicating that the request cannot be authenticated; and
in response to determining that the source at least partially matches the at least one server profile:
determine a first deployment operation associated with a first portion of the application data;
perform a first plurality of collected testing operations for the first portion of the application data based at least in part upon the first deployment operation;
determine first pod data indicating a first plurality of role parameters based at least in part upon the first deployment operation, the first plurality of role parameters being configured to indicate a first plurality of testing operations on the first portion of the application data;
associate a first pod out of a plurality of distributed pods in a network that at least partially matches the first pod data with the first portion of the application data, wherein the first pod comprises a first name-space;
determine a first configuration mapping associated with the first deployment operation for the first portion of the application data, wherein:
the first configuration mapping indicates access to a specific directory of the first pod and is configured to control access to the first portion of the application data;
the first deployment operation comprises a first control signal that triggers execution of a first test script associated with the first plurality of distributed testing operations;
create a first secret parameter based at least in part upon the first configuration mapping;
generate a first verification block based at least in part upon the first secret parameter and the first configuration mapping, the first verification block comprising verification information to enable the first pod to access the first portion of the application data;

provide the first verification block to the first pod;

perform a first role binding operation to bind the first pod to one or more application roles corresponding to the first portion of the application data, the first role binding operation enables runtime reconfiguration of an executing service to trigger alternating between the first plurality of distributed testing operations and the first plurality of collected testing operations;

trigger a first plurality of distributed testing operations at the first pod by providing the first verification block to the first pod;

determine a second deployment operation associated with a second portion of the application data;

perform a second plurality of collected testing operations for the second portion of the application data based at least in part upon the second deployment operation;

determine second pod data indicating a second plurality of role parameters based at least in part upon the second deployment operation, the second plurality of role parameters being configured to indicate a second plurality of testing operations on the second portion of the application data;

associate a second pod out of the plurality of distributed pods in the network that at least partially matches the second pod data with the second portion of the application data;

determine a second configuration mapping associated with the second deployment operation for the second portion of the application data, wherein:

the second configuration mapping indicates access to a specific directory of the second pod and is configured to control access to the second portion of the application data;

the second deployment operation comprises a second control signal that triggers execution of a second test script associated with the second plurality of distributed testing operations;

create a second secret parameter based at least in part upon the second configuration mapping;

generate a second verification block based at least in part upon the second secret parameter and the second configuration mapping, the second verification block comprising verification information to enable the second pod to access the second portion of the application data;

provide the second verification block to the second pod;

perform a second role binding operation to bind the second pod to one or more application roles corresponding to the second portion of the application data, the second role binding operation enables runtime reconfiguration of an executing service to trigger alternating between the second plurality of distributed testing operations and the second plurality of collected testing operations, wherein:

the second pod comprises a second name-space; and the second name-space is different from the first name-space; and trigger a second plurality of distributed testing operations at the second pod by providing the second verification block to the second pod, wherein:

the first pod is associated with a first container and a first plurality of resources;

the second pod is associated with a second container and a second plurality of resources;

the first plurality of distributed testing operations is different from the second plurality of distributed testing operations;

the first pod comprises a first container, first shared storage, and first network resources, the first shared storage and the first network resources being co-located and co-scheduled; and the second pod comprises a second container, second shared storage, and second network resources, the second shared storage and the second network resources being co-located and co-scheduled.

2. The apparatus of claim 1, wherein the processor is further configured to:

determine a third deployment operation associated with a third portion of the application data;

determine third pod data indicating a third plurality of role parameters based at least in part upon the third deployment operation, the third plurality of role parameters being configured to indicate a third plurality of testing operations on the third portion of the application data;

identify a third pod that at least partially matches the third pod data; and trigger a third plurality of distributed testing operations at the third pod.

3. The apparatus of claim 1, wherein the processor is further configured to:

determine a third deployment operation associated with a third portion of the application data;

determine third pod data indicating a third plurality of role parameters based at least in part upon the third deployment operation, the third plurality of role parameters being configured to indicate a third plurality of testing operations on the third portion of the application data;

identify a third pod that at least partially matches the third pod data; and trigger a third plurality of distributed testing operations at the third pod.

4. The apparatus of claim 3, wherein:

the first pod is configured to enable access between the first portion of the application data and a first plurality of users;

the second pod is configured to enable access between the second portion of the application data and a second plurality of users; and the third pod is configured to enable access between the third portion of the application data and a third plurality of users.

5. The apparatus of claim 4, wherein the processor is further configured to:

receive a first report indicating a first plurality of responses from the first plurality of users associated with the first pod;

receive a second report indicating a second plurality of responses from the second plurality of users associated with the second pod; and receive a third report indicating a third plurality of responses from the third plurality of users associated with the third pod.

6. The apparatus of claim 1, wherein the processor is further configured to perform one or more instructing node operations in a communication network.

7. The apparatus of claim 1, wherein the first pod is in a managed server configured to perform one or more worker node operations in a communication network.

8. A method, comprising:

receiving a request to release testing operations to one or more managed servers;

identifying a source of the request;

obtaining one or more server profiles from a role directory;

determining whether the source at least partially matches at least one server profile of the one or more server profiles;

in response to determining that the source does not at least partially match the at least one server profile, generating a report indicating that the request cannot be authenticated; and in response to determining that the source at least partially matches the at least one server profile:

determining a first deployment operation associated with a first portion of one or more portions of application data;

performing a first plurality of collected testing operations for the first portion of the application data based at least in part upon the first deployment operation;

determining first pod data indicating a first plurality of role parameters based at least in part upon the first deployment operation, the first plurality of role parameters being configured to indicate a first plurality of testing operations on the first portion of the application data;

associating a first pod out of a plurality of distributed pods in a network that at least partially matches the first pod data with the first portion of the application data, wherein the first pod comprises a first name-space;

determining a first configuration mapping associated with the first deployment operation for the first portion of the application data, wherein:

the first configuration mapping indicates access to a specific directory of the first pod and is configured to control access to the first portion of the application data;

the first deployment operation comprises a first control signal that triggers execution of a first test script associated with the first plurality of distributed testing operations;

creating a first secret parameter based at least in part upon the first configuration mapping;

generating a first verification block based at least in part upon the first secret parameter and the first configuration mapping, the first verification block comprising verification information to enable the first pod to access the first portion of the application data;

providing the first verification block to the first pod;

performing a first role binding operation to bind the first pod to one or more application roles corresponding to the first portion of the application data, the first role binding operation enables runtime reconfiguration of an executing service to trigger alternating between the first plurality of distributed testing operations and the first plurality of collected testing operations;

triggering a first plurality of distributed testing operations at the first pod by providing the first verification block to the first pod;

determining a second deployment operation associated with a second portion of the application data;

performing a second plurality of collected testing operations for the second portion of the application data based at least in part upon the second deployment operation;

determining second pod data indicating a second plurality of role parameters based at least in part upon the second deployment operation, the second plurality of role parameters being configured to indicate a second plurality of testing operations on the second portion of the application data;

associating a second pod out of the plurality of distributed pods in the network that at least partially matches the second pod data with the second portion of the application data;

determining a second configuration mapping associated with the second deployment operation for the second portion of the application data, wherein:

the second configuration mapping indicates access to a specific directory of the second pod and is configured to control access to the second portion of the application data;

the second deployment operation comprises a second control signal that triggers execution of a second test script associated with the second plurality of distributed testing operations;

creating a second secret parameter based at least in part upon the second configuration mapping;

generating a second verification block based at least in part upon the second secret parameter and the second configuration mapping, the second verification block comprising verification information to enable the second pod to access the second portion of the application data;

providing the second verification block to the second pod;

performing a second role binding operation to bind the second pod to one or more application roles corresponding to the second portion of the application data, the second role binding operation enables runtime reconfiguration of an executing service to trigger alternating between the second plurality of distributed testing operations and the second plurality of collected testing operations, wherein:

the second pod comprises a second name-space; and the second name-space is different from the first name-space; and triggering a second plurality of distributed testing operations at the second pod by providing the second verification block to the second pod, and wherein:

the first pod is associated with a first container and a first plurality of resources;

the second pod is associated with a second container and a second plurality of resources;

the first plurality of distributed testing operations is different from the second plurality of distributed testing operations;

the first pod comprises a first container, first shared storage, and first network resources, the first shared storage and the first network resources being co-located and co-scheduled; and the second pod comprises a second container, second shared storage, and second network resources, the second shared storage and the second network resources being co-located and co-scheduled.

9. The method of claim 8, further comprising:

determining a third deployment operation associated with a second portion of the application data;

determining second pod data indicating a second plurality of role parameters based at least in part upon the third deployment operation, the second plurality of role parameters being configured to indicate a second plurality of testing operations on the second portion of the application data;

identifying a second pod that at least partially matches the second pod data; and triggering a second plurality of distributed testing operations at the second pod.

10. The method of claim 8, further comprising:

determining a third deployment operation associated with a third portion of the application data;

determining third pod data indicating a third plurality of role parameters based at least in part upon the third deployment operation, the third plurality of role parameters being configured to indicate a third plurality of testing operations on the third portion of the application data;

identifying a third pod that at least partially matches the third pod data; and triggering a third plurality of distributed testing operations at the third pod.

11. The method of claim 10, wherein:

the first pod is configured to enable access between the first portion of the application data and a first plurality of users;

the second pod is configured to enable access between the second portion of the application data and a second plurality of users; and the third pod is configured to enable access between the third portion of the application data and a third plurality of users.

12. The method of claim 11, further comprising:

receiving a first report indicating a first plurality of responses from the first plurality of users associated with the first pod;

receiving a second report indicating a second plurality of responses from the second plurality of users associated with the second pod; and receiving a third report indicating a third plurality of responses from the third plurality of users associated with the third pod.

13. The method of claim 8, further comprising:

performing one or more instructing node operations in a communication network.

14. The method of claim 8, wherein the first pod is in a managed server configured to perform one or more worker node operations in a communication network.

15. A non-transitory computer readable medium storing instructions that when executed by a processor cause the processor to:

receive a request to release testing operations to one or more managed servers;

identify a source of the request;

obtain one or more server profiles from a role directory;

determine whether the source at least partially matches at least one server profile of the one or more server profiles;

in response to determining that the source does not at least partially match the at least one server profile, generate a report indicating that the request cannot be authenticated; and in response to determining that the source at least partially matches the at least one server profile:

determine a first deployment operation associated with a first portion of one or more portions of application data;

perform a first plurality of collected testing operations for the first portion of the application data based at least in part upon the first deployment operation;

determine first pod data indicating a first plurality of role parameters based at least in part upon the first deployment operation, the first plurality of role parameters being configured to indicate a first plurality of testing operations on the first portion of the application data;

associate a first pod out of a plurality of distributed pods in a network that at least partially matches the first pod data with the first portion of the application data, wherein the first pod comprises a first namespace;

determine a first configuration mapping associated with the first deployment operation for the first portion of the application data, wherein:

the first configuration mapping indicates access to a specific directory of the first pod and is configured to control access to the first portion of the application data;

the first deployment operation comprises a first control signal that triggers execution of a first test script associated with the first plurality of distributed testing operations;

create a first secret parameter based at least in part upon the first configuration mapping;

generate a first verification block based at least in part upon the first secret parameter and the first configuration mapping, the first verification block comprising verification information to enable the first pod to access the first portion of the application data;

provide the first verification block to the first pod;

perform a first role binding operation to bind the first pod to one or more application roles corresponding to the first portion of the application data, the first role binding operation enables runtime reconfiguration of an executing service to trigger alternating between the first plurality of distributed testing operations and the first plurality of collected testing operations;

trigger a first plurality of distributed testing operations at the first pod by providing the first verification block to the first pod;

determine a second deployment operation associated with a second portion of the application data;

perform a second plurality of collected testing operations for the second portion of the application data based at least in part upon the second deployment operation;

determine second pod data indicating a second plurality of role parameters based at least in part upon the second deployment operation, the second plurality of role parameters being configured to indicate a second plurality of testing operations on the second portion of the application data;

associate a second pod out of the plurality of distributed pods in the network that at least partially matches the second pod data with the second portion of the application data;

determine a second configuration mapping associated with the second deployment operation for the second portion of the application data, wherein:
the second configuration mapping indicates access to a specific directory of the second pod and is configured to control access to the second portion of the application data;
the second deployment operation comprises a second control signal that triggers execution of a second test script associated with the second plurality of distributed testing operations;
create a second secret parameter based at least in part upon the second configuration mapping;
generate a second verification block based at least in part upon the second secret parameter and the second configuration mapping, the second verification block comprising verification information to enable the second pod to access the second portion of the application data;
provide the second verification block to the second pod;
perform a second role binding operation to bind the second pod to one or more application roles corresponding to the second portion of the application data, the second role binding operation enables runtime reconfiguration of an executing service to trigger alternating between the second plurality of distributed testing operations and the second plurality of collected testing operations, wherein:
the second pod comprises a second name-space; and
the second name-space is different from the first name-space; and
trigger a second plurality of distributed testing operations at the second pod by providing the second verification block to the second pod, and
wherein:
the first pod is associated with a first container and a first plurality of resources;
the second pod is associated with a second container and a second plurality of resources;
the first plurality of distributed testing operations is different from the second plurality of distributed testing operations;
the first pod comprises a first container, first shared storage, and first network resources, the first shared storage and the first network resources being co-located and co-scheduled; and
the second pod comprises a second container, second shared storage, and second network resources, the second shared storage and the second network resources being co-located and co-scheduled.

16. The non-transitory computer readable medium of claim 15, wherein the instructions further cause the processor to:
determine a third deployment operation associated with a third portion of the application data;
determine third pod data indicating a third plurality of role parameters based at least in part upon the third deployment operation, the third plurality of role parameters being configured to indicate a third plurality of testing operations on the third portion of the application data;
identify a third pod that at least partially matches the third pod data; and
trigger a third plurality of distributed testing operations at the third pod.

17. The non-transitory computer readable medium of claim 15, wherein the instructions further cause the processor to:
determine a third deployment operation associated with a third portion of the application data;
determine third pod data indicating a third plurality of role parameters based at least in part upon the third deployment operation, the third plurality of role parameters being configured to indicate a third plurality of testing operations on the third portion of the application data;
identify a third pod that at least partially matches the third pod data; and
trigger a third plurality of distributed testing operations at the third pod.

18. The non-transitory computer readable medium of claim 17, wherein:
the first pod is configured to enable access between the first portion of the application data and a first plurality of users;
the second pod is configured to enable access between the second portion of the application data and a second plurality of users; and
the third pod is configured to enable access between the third portion of the application data and a third plurality of users.

19. The non-transitory computer readable medium of claim 18, wherein the instructions further cause the processor to:
receive a first report indicating a first plurality of responses from the first plurality of users associated with the first pod;
receive a second report indicating a second plurality of responses from the second plurality of users associated with the second pod; and
receive a third report indicating a third plurality of responses from the third plurality of users associated with the third pod.

20. The non-transitory computer readable medium of claim 15, wherein the instructions further cause the processor to:
perform one or more instructing node operations in a communication network.

* * * * *